United States Patent
Brosnan et al.

(10) Patent No.: US 9,138,821 B2
(45) Date of Patent: Sep. 22, 2015

(54) METHODS FOR SIMULTANEOUSLY BRAZING A FERRULE AND LEAD PINS

(71) Applicant: Medtronic, Inc., Minneapolis, MN (US)

(72) Inventors: William M. Brosnan, Rogers, MN (US); Rajesh V. Iyer, Eden Prairie, MN (US); George C. Johnstone, Brooklyn Center, MN (US); Susan A. Tettemer, Minneapolis, MN (US); Andrew J. Thom, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 14/260,401

(22) Filed: Apr. 24, 2014

(65) Prior Publication Data

US 2015/0202706 A1    Jul. 23, 2015

Related U.S. Application Data

(60) Provisional application No. 61/928,632, filed on Jan. 17, 2014.

(51) Int. Cl.
| | |
|---|---|
| *B23K 31/02* | (2006.01) |
| *B23K 1/00* | (2006.01) |
| *B23K 37/04* | (2006.01) |
| *H01R 4/02* | (2006.01) |
| *H01G 4/35* | (2006.01) |

(52) U.S. Cl.
CPC ............ *B23K 1/0016* (2013.01); *B23K 37/0426* (2013.01); *B23K 37/0435* (2013.01); *H01G 4/35* (2013.01); *H01R 4/027* (2013.01)

(58) Field of Classification Search
None
See application file for complete search history.

(56) References Cited

U.S. PATENT DOCUMENTS

| | | | | |
|---|---|---|---|---|
| 3,050,612 | A | * | 8/1962 | Eversole .................... 219/233 |
| 3,302,961 | A | * | 2/1967 | Franklin .................... 403/272 |
| 3,589,591 | A | * | 6/1971 | Schwenn .................. 228/44.7 |
| 3,601,750 | A | * | 8/1971 | Mancini ...................... 439/84 |
| 3,834,015 | A | * | 9/1974 | Di Renzo ................... 29/843 |
| 4,180,700 | A | * | 12/1979 | Kraska et al. ........ 174/152 GM |
| 4,420,877 | A | * | 12/1983 | McKenzie, Jr. ............. 29/739 |
| 4,462,534 | A | * | 7/1984 | Bitaillou et al. .......... 228/180.1 |
| 4,663,815 | A | * | 5/1987 | Hartman et al. ............ 29/839 |
| 4,678,868 | A | | 7/1987 | Kraska et al. |
| 4,767,344 | A | * | 8/1988 | Noschese .................... 439/83 |
| 4,774,760 | A | * | 10/1988 | Seaman et al. .............. 29/840 |
| 4,841,101 | A | * | 6/1989 | Pollock ............... 174/152 GM |
| 4,842,184 | A | * | 6/1989 | Miller, Jr. ............... 228/180.1 |
| 4,884,335 | A | * | 12/1989 | McCoy et al. .............. 29/839 |
| 4,940,858 | A | | 7/1990 | Taylor et al. |
| 5,029,748 | A | * | 7/1991 | Lauterbach et al. ....... 228/180.1 |
| 5,092,035 | A | * | 3/1992 | McMichen et al. .......... 29/845 |
| 5,145,104 | A | * | 9/1992 | Apap et al. ............. 228/180.1 |
| 5,324,892 | A | * | 6/1994 | Granier et al. ............. 174/250 |
| 5,333,095 | A | * | 7/1994 | Stevenson et al. .......... 361/302 |
| 5,406,444 | A | * | 4/1995 | Selfried et al. ............. 361/302 |
| 5,533,665 | A | * | 7/1996 | Sinclair et al. .......... 228/180.1 |

(Continued)

FOREIGN PATENT DOCUMENTS

| | | | | |
|---|---|---|---|---|
| EP | 916364 | A2 * | 5/1999 | ............ A61N 1/375 |
| EP | 1191556 | A2 * | 3/2002 | ............ H01G 4/35 |

(Continued)

*Primary Examiner* — Kiley Stoner

(57) ABSTRACT

A lead pin fixture is used to align and hold lead pins in place for brazing lead pins to metal contact pads of a ceramic insulator and brazing a ferrule to the ceramic insulator in a single step.

12 Claims, 3 Drawing Sheets

(56) References Cited

U.S. PATENT DOCUMENTS

| | | | |
|---|---|---|---|
| 5,699,954 A * | 12/1997 | Bell | 228/180.1 |
| 5,870,272 A | 2/1999 | Seifried et al. | |
| 5,905,627 A * | 5/1999 | Brendel et al. | 361/302 |
| 6,186,216 B1 * | 2/2001 | Bolde et al. | 164/131 |
| 6,325,280 B1 * | 12/2001 | Murphy | 228/246 |
| 6,490,148 B1 * | 12/2002 | Allen et al. | 361/302 |
| 6,586,675 B1 | 7/2003 | Bealka et al. | |
| 6,768,629 B1 | 7/2004 | Allen et al. | |
| 6,812,404 B1 * | 11/2004 | Martinez | 174/50.61 |
| 6,852,925 B2 | 2/2005 | Wolf et al. | |
| 7,035,076 B1 * | 4/2006 | Stevenson | 361/302 |
| 7,035,077 B2 * | 4/2006 | Brendel | 361/302 |
| 7,187,535 B1 * | 3/2007 | Iyer et al. | 361/302 |
| 7,812,691 B1 | 10/2010 | Fisk et al. | |
| 8,991,680 B1 * | 3/2015 | Schulman et al. | 228/180.1 |
| 2002/0165588 A1 * | 11/2002 | Fraley et al. | 607/37 |
| 2003/0139096 A1 * | 7/2003 | Stevenson et al. | 439/620 |
| 2004/0231877 A1 * | 11/2004 | Wolf et al. | 174/50.61 |
| 2004/0232204 A1 * | 11/2004 | Wolf | 228/49.1 |
| 2005/0067470 A1 * | 3/2005 | Ju | 228/245 |
| 2005/0092507 A1 | 5/2005 | Marshall et al. | |
| 2005/0190527 A1 * | 9/2005 | Stevenson et al. | 361/302 |
| 2006/0175071 A1 | 8/2006 | Knappen et al. | |
| 2006/0221543 A1 * | 10/2006 | Stevenson et al. | 361/302 |
| 2006/0279312 A1 * | 12/2006 | Kent et al. | 324/765 |
| 2007/0043399 A1 * | 2/2007 | Stevenson et al. | 607/37 |
| 2007/0134985 A1 | 6/2007 | Frysz et al. | |
| 2007/0179551 A1 * | 8/2007 | Iyer et al. | 607/36 |
| 2007/0179553 A1 * | 8/2007 | Iyer et al. | 607/37 |
| 2007/0183118 A1 | 8/2007 | Fu et al. | |
| 2007/0217121 A1 * | 9/2007 | Fu et al. | 361/302 |
| 2007/0234540 A1 * | 10/2007 | Iyer et al. | 29/25.42 |
| 2007/0239223 A1 * | 10/2007 | Engmark et al. | 607/37 |
| 2008/0294220 A1 * | 11/2008 | Stevenson et al. | 607/36 |
| 2009/0059468 A1 * | 3/2009 | Iyer | 361/302 |
| 2009/0079517 A1 * | 3/2009 | Iyer | 333/182 |
| 2009/0080140 A1 * | 3/2009 | Iyer et al. | 361/302 |
| 2009/0321107 A1 * | 12/2009 | Taylor et al. | 174/110 R |
| 2010/0038358 A1 * | 2/2010 | Dingle et al. | 219/616 |
| 2010/0177458 A1 * | 7/2010 | Iyer | 361/302 |
| 2010/0202096 A1 * | 8/2010 | Iyer | 361/302 |
| 2010/0252311 A1 * | 10/2010 | Murphy | 174/260 |
| 2010/0284124 A1 * | 11/2010 | Iyer | 361/302 |
| 2011/0032658 A1 * | 2/2011 | Iyer | 361/302 |
| 2011/0059331 A1 * | 3/2011 | Smith et al. | 428/596 |
| 2011/0106205 A1 | 5/2011 | Reiterer et al. | |
| 2011/0106228 A1 | 5/2011 | Reiterer et al. | |
| 2011/0284284 A1 | 11/2011 | Talamine et al. | |
| 2011/0297439 A1 * | 12/2011 | Talamine et al. | 174/650 |
| 2011/0303458 A1 * | 12/2011 | Sutay et al. | 174/650 |
| 2011/0308850 A1 * | 12/2011 | Ni et al. | 174/261 |
| 2012/0055256 A1 * | 3/2012 | Drewes | 73/753 |
| 2012/0196493 A1 * | 8/2012 | Murphy et al. | 439/842 |
| 2012/0307416 A1 * | 12/2012 | Iyer | 361/302 |
| 2012/0309237 A1 * | 12/2012 | Marzano et al. | 439/675 |
| 2013/0062398 A1 * | 3/2013 | Wang | 228/203 |
| 2013/0070387 A1 * | 3/2013 | Stevenson et al. | 361/302 |
| 2013/0127041 A1 * | 5/2013 | Goh | 257/737 |
| 2013/0184797 A1 | 7/2013 | Tang et al. | |
| 2014/0194964 A1 * | 7/2014 | Woods et al. | 607/119 |
| 2014/0345934 A1 * | 11/2014 | Markham et al. | 174/667 |

FOREIGN PATENT DOCUMENTS

| | | | | |
|---|---|---|---|---|
| EP | 1688160 A2 * | 8/2006 | | |
| JP | 59118269 A * | 7/1984 | | B23K 3/00 |
| WO | WO 9736710 A1 * | 10/1997 | | B23K 3/06 |

* cited by examiner

METHODS FOR SIMULTANEOUSLY BRAZING A FERRULE AND LEAD PINS

BACKGROUND

The disclosure is related to methods of making feedthrough interconnects for electrical devices, for example, medical devices. The disclosure also is related to assemblies used in the methods of making such feedthrough interconnects.

SUMMARY

In one embodiment, a method for making a brazed feedthrough is described. The method includes simultaneously brazing a ferrule to an insulator and lead pins to pads on the insulator using braze preforms. The method includes providing a freestanding lead pin fixture comprising a plurality of lead pin fixture holes through the lead pin fixture, the holes configured to accept insertion of the at least one lead pin, the freestanding lead pin fixture configured to be placed over the feedthrough such that the at least one fixtured lead pin and a braze preform are aligned and in contact with the contact pad on the surface of the ceramic insulator, inserting at least one lead pin into a hole in the lead pin fixture, placing said freestanding lead pin fixture over the feedthrough such that the at least one fixtured lead pin and the braze preform are aligned and in contact with the contact pad on the surface of the ceramic insulator to form a feedthrough assembly, and heating the feedthrough assembly at a temperature and for a time sufficient to form brazed joints between the ferrule and the ceramic insulator and the at least one lead pin and the contact pad.

In another aspect of the method above, the braze preform may be attached to the head of a lead pin or the braze preform can be placed on the contact pad on the surface of the ceramic insulator before the fixtured lead pin in the lead pin fixture is aligned with the contact pad and ceramic insulator, respectively.

In another embodiment, an assembly comprises a lead pin fixture comprising a feedthrough insertion cutout and a plurality of lead pin fixture holes through the lead pin fixture, and at least one lead pin fit within one of the plurality of lead pin fixture holes, the at least one lead pin having a proximate end of the lead pin, and a feedthrough fitted within the feedthrough insertion cutout of the lead pin fixture and comprising a ceramic insulator having at least one conductive via, the at least one via having a contact pad on a surface of the ceramic insulator, a lead pin braze preform between and contacting the contact pad and the proximate end of the at least one lead pin, a ferrule surrounding the ceramic insulator and a ferrule braze preform around the ceramic insulator and between the ferrule and the ceramic insulator.

DETAILED DESCRIPTION

Methods and assemblies used for constructing or making feedthrough assemblies are described. Such feedthrough assemblies described in this application are typically used within implantable medical devices to provide electrical connections from within a hermetically sealed medical device or component of a medical device, to the exterior of the medical device or medical device component. These are also known as "interconnects". The methods and assemblies described in this application allow simultaneous brazing of a ferrule to an insulator and the lead pins to contact pads on a surface of the insulator. A lead pin fixture is used to provide repeatable alignment of the feedthrough pins with the contact pads on the insulator or feedthrough. Multiple assemblies can be used to make multiple finished feedthrough assemblies simultaneously.

Figure 1:
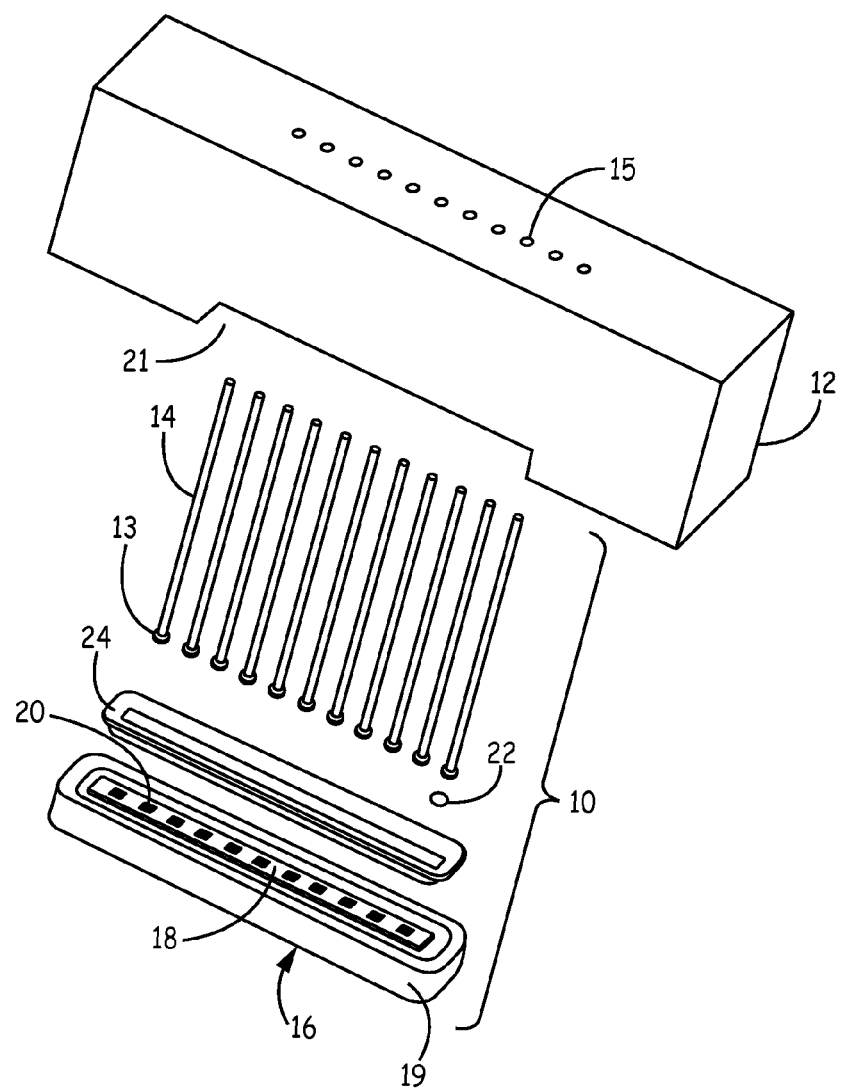
FIG. 1 is a depiction of an exploded view of an embodiment of a feedthrough assembly and a lead pin fixture prior to assembly.

FIG. 1 is an exploded view of a feedthrough interconnect or assembly 10 and a lead pin fixture 12 prior to assembly and brazing. In this embodiment feed through assembly 10 comprises at least one feedthrough pin 14 and a feedthrough 16. Feedthrough 16 comprises a ceramic insulator 18 having at least one conductive via 17 and at least one contact pad 20 attached to the conductive via and present at the surface of the ceramic insulator. Surrounding the ceramic insulator is a ferrule 19. Feedthrough assembly 10 further includes a lead pin braze preform 22 on each of the heads 13 of lead pins 14 to be brazed and a ferrule braze preform 24 adapted to be placed around the ceramic insulator between the ceramic insulator 18 and the ferrule 19. Alternatively, the lead pin braze preforms 22 may be placed onto the contact pads 20 and then mated to the heads 13 of the lead pins 14.

Figure 2:
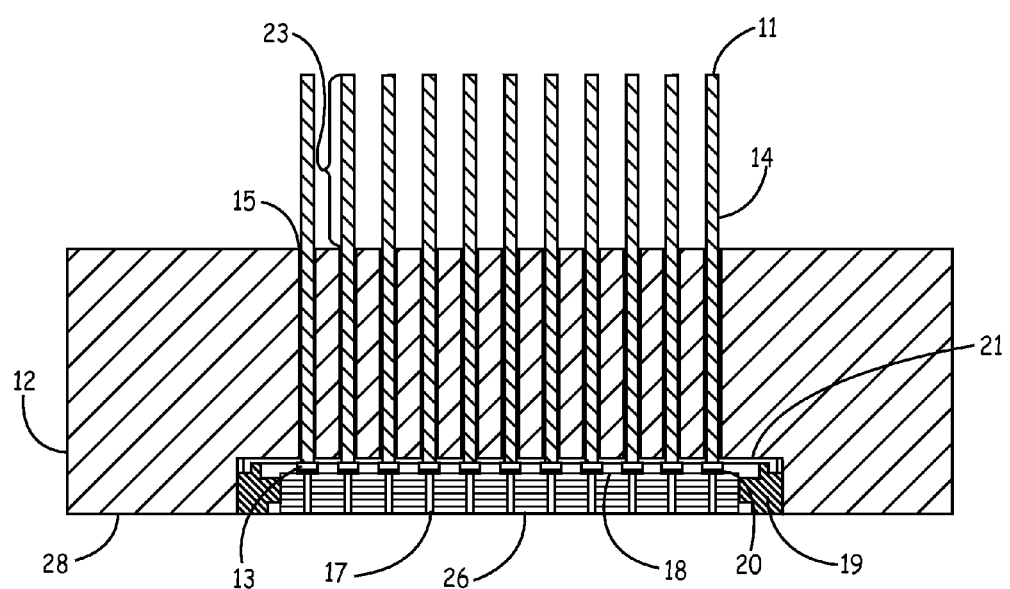
FIG. 2 is a depiction of an assembled feedthrough assembly and lead pin fixture in cross-section.

As shown in FIG. 2, freestanding lead pin fixture 12 is configured to align and support lead pins 14 within lead pin fixture holes 15 such that the preforms 22 attached to the heads 13 of the pins 14 align with the conductive contact pads 20 of the ceramic insulator 18. Lead pin fixture 12 is also configured to accept feedthrough 16 within an indention or cutout 21 in the lead pin fixture. In this embodiment, cutout 21 has dimensions such that feedthrough 16 fits within the cutout 21 and the bottom surface 26 of the feedthrough is substantially aligned with the bottom surface 28 of the lead pin fixture for placement of the combined feedthrough assembly 10 and lead pin fixture 12 onto a substrate before heating the combined assembly to melt the braze preforms and form braze joints between the ferrule and the ceramic insulator and the at least one lead pin and the contact pad. In other embodiments, feedthrough bottom surface 26 and lead pin fixture bottom surface 28 are not substantially aligned. Alignment or non-alignment is dependent upon the particular feed through design. Distal ends 11 of lead pins and distal portions 23 of lead pins extend outwardly from the lead pin fixture and out of the lead pin fixture holes 15.

In the embodiments shown in FIGS. 1 and 2, the feedthrough 16 is substantially rectangular in shape. In these embodiments, the shape of the cutout 21 in the lead pin fixture 12 is substantially dependent upon the shape of the feedthrough. In other embodiments, the shape of the feedthrough can be almost any shape including the shape of a square, a circle, an oval, a cylinder, an ellipse, or a triangle, including shapes that are substantially the shape of any of the previously mentioned shapes. Similarly, the shape of the corresponding cutout in the lead pin fixture can be any shape which accepts a feedthrough having a given shape and which substantially aligns the heads of the feedthrough pins with the contact pads on the ceramic insulator of the feedthrough.

The brazing preforms typically comprise gold.

Typically the lead pins are made from niobium and alloys containing niobium. Other useful materials include platinum and platinum-iridium alloys. The number of lead pins can vary from 1 to 20 or more. In other embodiments, the number of lead pins can be 1, 2, 3, 4, 5, 6, 7, 8, 9, 10, 11, 12, 13, 14, 15, 16 17, 18 or 19. Typically, the lead pins have a diameter of about 0.38 mm and the lead pin heads typically have diameters that range from 0.5 to 0.8 mm.

Typically the conductive vias and the contact pads are made of platinum and alloys containing platinum. The conductive contact pads can be any shape and are typically square or round in shape.

Typically, the ceramic insulator 18 is primarily formed from a material that is generally electrically non-conductive, an insulator, or a dielectric. The ceramic insulator further includes one or more conductive vias 17 having contact pads 20 that are generally electrically conductive and that extend through the ceramic insulator that is generally electrically non-conductive. In other embodiments, the vias 17 are integrated with the ceramic insulator 18 but do not extend directly through, and instead extend through the insulator by a tortuous path.

Typically, the ceramic material used to make the ceramic insulator includes alumina (e.g., aluminum oxide, corundum), such as at least 70% alumina or about 92% or 96% alumina. The ceramic material is formed or molded and a metallic paste is placed into holes in the 'green' molded ceramic insulator to form the vias and contact pads. The assembly is then co-fired together in a kiln to form the finished ceramic insulator or "co-fire feedthrough". Typically, the ferrule 19 is made from a material that comprises titanium. Examples of the materials and processes used to make feedthroughs that can be used in the processes disclosed in this application can be found in U.S. Pat. No. 8,588,916, incorporated by reference for the description of materials and processes used to make such feedthroughs.

The lead pin fixture can be made of any material that is resistant to the temperatures required for melting the braze preform materials. Useful materials include graphite (typically coated with silicon carbide or titanium oxide), aluminum oxide, silicon carbide, silicon nitride and combinations thereof. Typically, the lead pin fixture is made from a material or is coated with a material that is unreactive with titanium. The lead pin fixtures can be made by molding or machining techniques or a combination of both.

In the embodiment shown in FIGS. 1 and 2 the shape of the lead pin fixture is substantially rectangular and has a thickness having a dimension greater than the width of the feedthrough. The feedthrough insertion indention or cutout in the lead pin fixture has dimensions adapted to accept the dimensions of the feedthrough and align the conductive contact pads of the feedthrough with the preform-capped heads of the lead pins that are held within the holes in the lead pin fixture. In the embodiment shown in FIG. 2, the interior surface of the cutout is designed to mate with the exterior features or design of the ferrule. Such mating features are designed to ensure alignment of the feedthrough and contact pads with the preform-capped heads of the lead pins and to minimize errors in assembly. Such mating features could be unique for different feedthroughs and lead pin fixtures to help ensure that the correct feedthroughs are brazed to the correct lead pins.

In one embodiment, lead pin braze preforms are formed, typically by stamping and then cold pressed onto the heads of the lead pins. The lead pin braze preforms could also be attached by laser or resistance-spot welding methods. Applicants have found that for a lead pin head having a size or area of about 0.3 mm2 the approximate amount of preform material required to form a robust braze joint is about 4.1×10-5 cm3. The area of the lead pin heads may typically range from about 0.2 mm2 to about 0.5 mm2, including any area or range of areas within such range.

Figure 3:
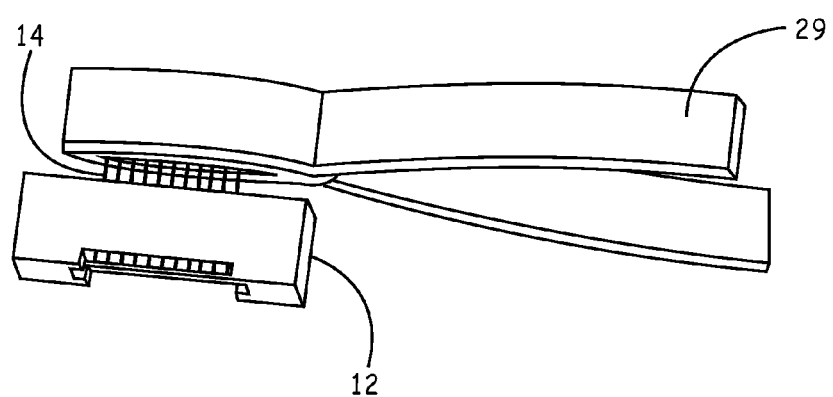
FIG. 3 is a depiction of a clamp holding the distal fee ends of the pins after the lead pins have been inserted into a freestanding lead pin fixture.

Once the lead pin braze preforms are attached to the heads of the lead pins, the distal ends of the lead pins are inserted into the lead pin fixture holes that are within the cutout in the lead pin fixture. After insertion of the lead pins, the lead pin fixture is stored on its side to keep the lead pins in place. In another embodiment shown in FIG. 3, the free ends of the lead pins 14 are held in place by hand or a clamp 29 and the free end of the lead pins is released after the lead pin fixture 12 is aligned and placed over the feedthrough. Clamp 29 is in the form of a pliers-type clamp having a foam or other shape compliant grip so as to not damage the free ends of the pins.

In another embodiment, the lead pin braze preforms are placed onto the contact pads, the distal ends of the lead pins are inserted into the lead pin fixture holes that are within the cutout in the lead pin fixture, and the heads of the lead pins are mated with or contact the lead pin braze preforms. After insertion of the lead pins, the lead pin fixture is stored on its side to keep the lead pins in place. Alternatively, the free end of the lead pins is held in place by hand or a clamp and the free end of the lead pins is released after the lead pin fixture is aligned and placed over the feedthrough.

The ferrule braze preform is typically formed by stamping. The shape of the ferrule braze preform is dependent upon the shape and dimensions of the ceramic insulator and the surrounding ferrule.

Once the lead pin fixture holding a plurality of lead pins is placed over the feedthrough, the entire assembly is heated to melt the braze preform material to form brazed joints between the ferrule and the ceramic insulator and the at least one lead pin and the contact pad simultaneously and in one heating or brazing step. Typically, the assemblies are heated within a vacuum furnace set at a temperature of about 1085° C., or a range from about 1000-1150° C. for approximately 1 minute, and then allowed to cool to room temperature.

The invention claimed is:

1. A method for simultaneously brazing a ferrule and lead pins comprising:
   providing a feedthrough comprising a ceramic insulator having at least one conductive via, the at least one via having a contact pad on a surface of the ceramic insulator, a ferrule surrounding the ceramic insulator and a ferrule braze preform around the ceramic insulator and between the ferrule and the ceramic insulator;
   providing at least one lead pin having a head at a proximal end and having a distal end, and a lead pin braze preform attached to the head;
   providing a freestanding lead pin fixture comprising a plurality of lead pin fixture holes through the lead pin fixture, the holes configured to accept insertion of the at least one lead pin, the freestanding lead pin fixture configured to be placed over the feedthrough such that the at least one fixtured lead pin and attached braze preform are aligned and in contact with the contact pad on the surface of the ceramic insulator;
   inserting the at least one lead pin into the at least one lead pin fixture holes;
   placing said freestanding lead pin fixture over the feedthrough such that the at least one fixtured lead pin and attached braze preform are aligned and in contact with the contact pad on the surface of the ceramic insulator to form a feedthrough assembly; and heating the feedthrough assembly at a temperature and for a time sufficient to form brazed joints between the ferrule and the ceramic insulator and the at least one lead pin and the contact pad.

2. The method of claim 1 further comprising holding the distal end of the at least one lead pin in place before placing said freestanding lead pin fixture over the feedthrough.

3. The method of claim 1 wherein the feedthrough assembly is heated at a temperature of about 1000-1150° C.

4. The method of claim 2 wherein the distal end of the at least one lead pin is held in place by a clamp.

5. An assembly comprising:
a lead pin fixture comprising a feedthrough insertion cutout and a plurality of lead pin fixture holes through the lead pin fixture, and at least one lead pin fit within one of the plurality of lead pin fixture holes, the at least one lead pin having a proximate end of the lead pin; and
a feedthrough fitted within the feedthrough insertion cutout of the lead pin fixture and comprising a ceramic insulator having at least one conductive via, the at least one via having a contact pad on a surface of the ceramic insulator, a lead pin braze preform between and contacting the contact pad and the proximate end of the at least one lead pin, a ferrule surrounding the ceramic insulator and a ferrule braze preform around the ceramic insulator and between the ferrule and the ceramic insulator.

6. The assembly of claim 5 wherein the at least one lead pin has a lead pin head at the proximate end of the lead pin.

7. The assembly of claim 5 wherein the at least one lead pin has a distal portion and a distal end, wherein the distal portion and the distal end of the at least one lead pin extends out of the lead pin fixture.

8. The assembly of claim 7 further comprising a clamp position at a point along the distal portion of the at least one lead pin.

9. A method for simultaneously brazing a ferrule and lead pins comprising providing a feedthrough comprising a ceramic insulator having at least one conductive via, the at least one via having a contact pad on a surface of the ceramic insulator, a lead pin braze preform on the contact pad, a ferrule surrounding the ceramic insulator and a ferrule braze preform around the ceramic insulator and between the ferrule and the ceramic insulator;

providing at least one lead pin having a head at a proximal end and having a distal end;

providing a freestanding lead pin fixture comprising a plurality of lead pin fixture holes through the lead pin fixture, the holes configured to accept insertion of the at least one lead pin, the freestanding lead pin fixture configured to be placed over the feedthrough such that the at least one fixtured lead pin and braze preform are aligned and in contact with the contact pad on the surface of the ceramic insulator;

inserting the at least one lead pin into the at least one lead pin fixture holes;

placing said freestanding lead pin fixture over the feedthrough such that the head of the at least one fixtured lead pin is aligned and in contact with the braze preform on the contact pad on the surface of the ceramic insulator to form a feedthrough assembly; and heating the feedthrough assembly at a temperature and for a time sufficient to form brazed joints between the ferrule and the ceramic insulator and the at least one lead pin and the contact pad.

10. The method of claim 9 further comprising holding the distal end of the at least one lead pin in place before placing said freestanding lead pin fixture over the feedthrough.

11. The method of claim 10 wherein the distal end of the at least one lead pin is held in place by a clamp.

12. The method of claim 9 wherein the feedthrough assembly is heated at a temperature of about 1000-1150° C.

* * * * *